(12) United States Patent
Reznik

(10) Patent No.: US 6,360,557 B1
(45) Date of Patent: Mar. 26, 2002

(54) COUNTER FLOW AIR CYCLE AIR CONDITIONER WITH NEGATIVE AIR PRESSURE AFTER COOLING

(76) Inventor: Igor Reznik, 2424 Kings Hwy., Apt. 6F, Brooklyn, NY (US) 11229

( * ) Notice: Subject to any disclaimer, the term of this patent is extended or adjusted under 35 U.S.C. 154(b) by 0 days.

(21) Appl. No.: 09/678,461

(22) Filed: Oct. 3, 2000

(51) Int. Cl.⁷ ............................. F25D 9/00; F25D 17/06
(52) U.S. Cl. ................... 62/402; 62/94; 62/401
(58) Field of Search ................ 62/87, 88, 94, 62/401, 402

(56) References Cited

U.S. PATENT DOCUMENTS

| | | | |
|---|---|---|---|
| 2,698,525 A | * 1/1955 | Lindenblad | 62/87 |
| 3,213,640 A | * 10/1965 | Dubinsky et al. | 62/402 |
| 4,015,438 A | * 4/1977 | Kinsell et al. | 62/88 |
| 5,121,610 A | * 6/1992 | Atkinson et al. | 62/151 |
| 5,172,753 A | * 12/1992 | Kadle et al. | 165/42 |
| 5,461,882 A | * 10/1995 | Zywiak | 62/401 |
| 5,568,731 A | * 10/1996 | Reali | 62/87 |
| 5,642,629 A | * 7/1997 | Ohman | 62/401 |
| 6,041,615 A | * 3/2000 | Ostersetzer et al. | 62/402 |

* cited by examiner

*Primary Examiner*—William C. Doerrler
(74) *Attorney, Agent, or Firm*—Keusey, Tutunjian & Bitetto (57) ABSTRACT

An air cycle air conditioning system is provided that utilizes the compartment to be cooled as a heat storage chamber within the system. In an automobile environment, the use of the enclosed passenger compartment as a heat storage chamber within the air cycle system enables the construction and implementation of a compact low energy consumption air conditioning system within the automobile. Through the use of valves within the system, the air cycle air conditioner is easily converted into a heat pump for the passenger compartment. The system of the present invention can be implemented in industrial, commercial, residential and/or automobile applications.

12 Claims, 9 Drawing Sheets

COUNTER FLOW AIR CYCLE AIR CONDITIONER WITH NEGATIVE AIR PRESSURE AFTER COOLING

BACKGROUND OF THE INVENTION

1. Field of the Invention

The present invention relates to air conditioning systems, and more particularly, to a compact air cycle air conditioner that utilizes the area to be cooled as a heat or cold storage chamber.

2. Description of the Related Art

Air cycle air conditioners have been proposed for some years as an alternative to vapor-compression air conditioners in residential, commercial and automobile applications, see for example, U.S. Pat. Nos. 5,121,610 and 5,295,370. This is because they have several advantages over vapor-compression systems. Firstly, because the evaporators of vapor-compression heat pump devices operate at or near 0° C., their heating capacity is seriously impaired at low ambient temperatures, since they rely on heat transfer from ambient to the evaporator. Secondly, in cold weather ice forms on the evaporator heat transfer surfaces thereby increasing pressure losses and also reducing evaporator effectiveness. Thirdly, vapor-compression devices use chlorofluorocarbons (CFCs) as the refrigerant which presents manufacturing and maintenance problems with regard to refrigerant leakage, problems which are substantially reduced when air is used as the refrigerant. In addition, CFCs are known to have a harmful effect on the Earth's ozone layer and it is thought that they may also be contributing to global warming caused by the so-called greenhouse effect.

Despite these advantages, air cycle air conditioning systems have yet to make a significant impact on the residential, telecommunications and more particularly the automobile markets. This can be attributed to the fact that air cycle designs have been previously based on regenerative heat exchangers for improving the coefficient of performance (COP). However, the improvement is minimal when the increased losses due to the presence of the heat exchanger(s) are taken into account, and may also be seen as expendable when offset against the attendant increases in complexity, size and cost of the conditioning system.

For purposes of automobile and telecommunication applications, these prior art air conditioning systems have proven to be too large and or not sufficient. For systems utilizing CFCs, a condenser is required and placed in front of the automobile radiator. This increases the heat load for the entire cooling system of the engine. In addition, when Freon or other CFCs are used, these systems generally come with high maintenance costs. When using a straight air cycle air conditioning system that generally consists of a compressor, air to air or air to water heat exchanger and a cooling turbine, the advantage is that they are generally compact in nature and low in maintenance costs. However, similar to the CFC systems, the heat exchanger is disposed in front of the automobile radiator which inherently prevents the heat exchanger from enabling a reduction in the temperature of the compressed air below that of the outside air. Thus, in order to reach and air temperature close to 0° C. after the turbine, higher pressure is required in the compressor. This higher pressure requirement required significantly more power which takes away from the engine power provided to the automobile. In addition, since the air from the turbine is generally fed directly into the automobile cabin space, there is a high noise level associated with such systems.

In telecommunication systems, the size of the air conditioning unit is significant part of design considerations for rack and cabinet type systems. Therefore, an air cycle air conditioning system that operates efficiently and can be made small enough to fit within or on a telecommunications rack cabinet without consuming a large amount of valuable space would be desirable.

In addition, if for example you have air with 30° C. and 60% humidity, in order to cool this air from 30° C. to 0° C. requires approximately twice the amount of energy than otherwise required to cool dry 30° C. air to 0° C.

SUMMARY OF THE INVENTION

It is therefore an object of the invention to provide a more compact and efficient air cycle air conditioning system.

It is another object of the invention to provide a more compact and efficient air cycle air conditioning system that can be specifically integrated into automobiles by using the automobile cabin as a heat or cold storage chamber and thereby eliminate the need for a heat exchanger disposed in front of the car radiator.

This and other objects are achieved in accordance with an embodiment of the present invention in which the air cycle air conditioning system includes a compartment to be cooled that is adapted to operate as a primary heat or cold storage chamber within the system. A cooling turbine is connected to the heat or cold storage compartment and serves to expand the air received from the compartment. A main heat exchanger receives the expanded air from the cooling turbine and in conjunction with a fan, is used to blow the cooled air within the main heat exchanger into the compartment. A main compressor is operable to compress the expanded air prior to exhausting it from the system, and as such can be utilized like a turbo charger for the engine. In this manner, the compressors can be used to power the air cycle air conditioning system, and the exhaust from the compressors can be used to work in conjunction with a turbo charger for the car engine.

In other embodiments, a desiccant is added to remove moisture from the ambient air blown into the system and additional valves can be added to enable the operation of the air cycle system as both and air conditioner and a heat pump.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the several views.

DETAILED DESCRIPTION OF PREFERRED EMBODIMENTS

Figure 1A:
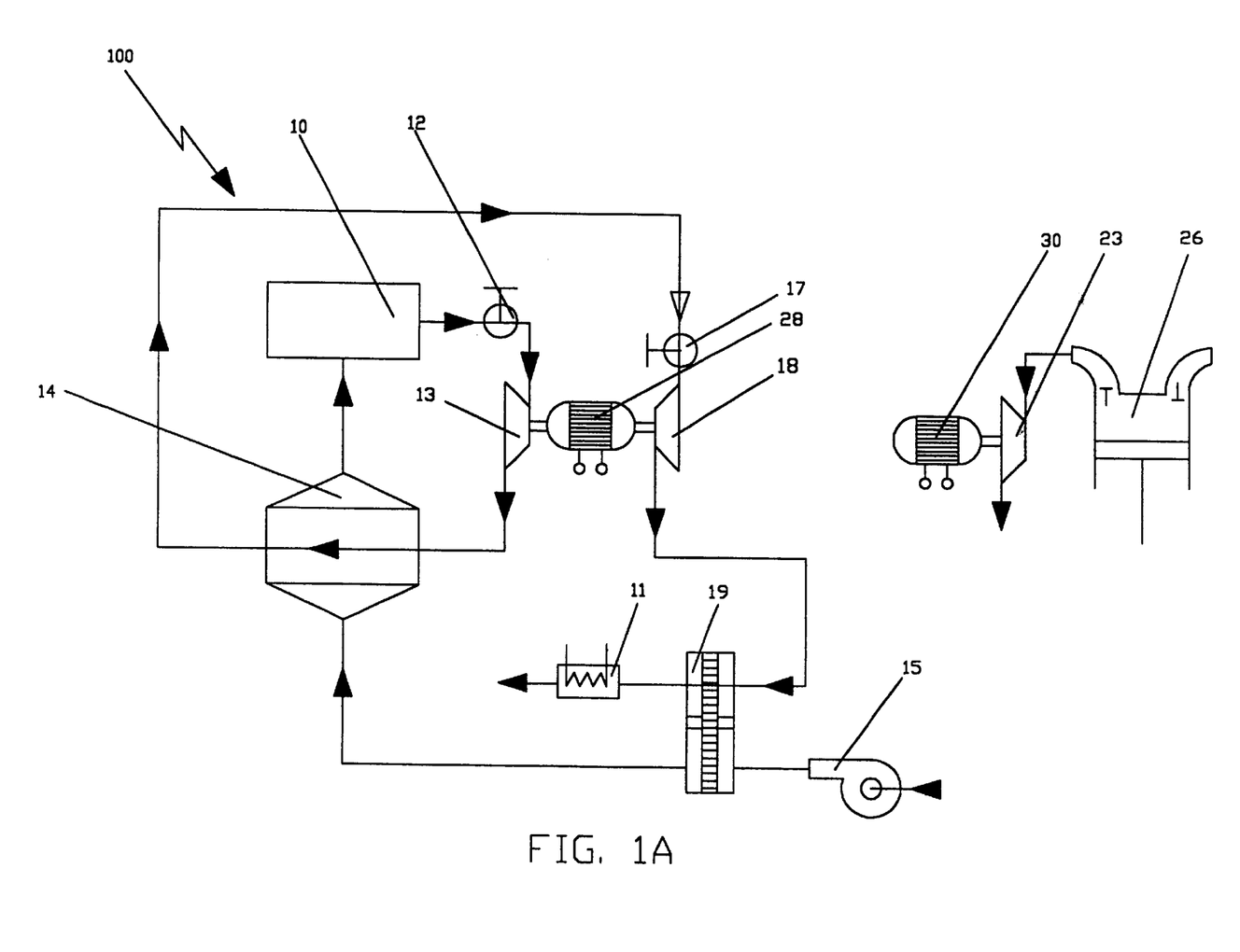
FIG. 1a is a schematic view of the air cycle air conditioning system according to a first embodiment of the invention.

Referring to FIG. 1a, there is shown a reverse (sub atmospheric pressure) air cycle air conditioning system 100 according to a first embodiment of the present invention. The system 100 consists of a cabin 10 that operates as a primary heat or cold storage chamber, a cooling turbine 13, a main heat exchanger 14 with a fan 15, a main compressor 18 which sits on the same shaft as the cooling turbine 13 and which can be driven by a high speed electric motor 28. The source of the energy can be from generator 30 which is driven by an exhaust turbine 23 which is preferably disposed within the exhaust path of the engine 26. Valves 12 and 17 are implemented to adjust the air flow through the system.

In accordance with another embodiment, a desiccant 19 is added to the system between the fan 15 output and the input to the heat exchanger 14. Desiccant 19 is added here to absorb the moisture in the ambient air being blown into the system, and thereby reduces the amount of energy need to cool the drier ambient air. As mentioned previously, the amount of energy required to cool air having 60% humidity is approximately twice the amount of energy required to cool drier air of the same temperature. Desiccant 19 can be any suitable known type of desiccant and may be a regenerative wheel in which we use hot air exhausted from the system to regenerate the desiccant for further use. This will be described in conjunction with the operation of the system.

The present invention will be described, by way of example, using an automobile environment, however, those of ordinary skill in the art will recognize that the principles and systems disclosed herein have many different industrial, residential, commercial applications and is therefore not limited to the example disclosed herein.

Generally, the temperature inside the passenger compartment or cabin 10 can reach as high as 80° C. when sitting in the sun, even when the ambient temperature outside the cabin 10 is approximately 45° C. In accordance with one embodiment, system 100 is driven by high speed electric motor 28. Thus, when the air cycle air conditioning system 100 is started, the 80° C. air within cabin 10 passes through valve 12 and into cooling turbine 13. The cooling turbine 13 cools the air by process of expansion. Within cooling turbine 13, the air pressure is reduced to 0.5–0.8 Atmosphere (Atm). The amount of cooling that takes place at this stage is dependent on the coefficient of efficiency (COE) of the cooling turbine 13. Assuming an 85% COE, the air temperature in the cooling turbine 13 will be reduced by approximately 25.5° C. Thus, the air now at 55° C. at 0.6 Atm leaves the cooling turbine 13 and is passed through the main heat exchanger 14 where it is used to cool the air blown by fan 15 through desiccant wheel 19 and heat exchanger 14 and into cabin 10. Desiccant wheel 19 dries the ambient air by absorbing the moisture in the air and provides a drier air input to the system. Thus, the original 80° C. air within cabin 10 can be reduced to approximately 55° C.

Since the 55° C. air coming from the cooling turbine 13 during the this first cycle is higher in temperature than the outside ambient air (e.g., 45° C.), it is obviously not cool enough to cool the car cabin below the 45° C. outside air, but is still colder than that the 80° C. air originally present in the cabin 10. It is therefore obvious that the cooling effect will require additional cycles to reduce the temperature to less than the outside ambient air (e.g., <45° C.). In accordance with another embodiment, when the system is first started and the ambient air outside the car cabin is, for example, 45° C., and the air inside the cabin 10 is 80° C., the system may start by forcing the 45° C. ambient air into the turbine 13 through valve 12 for a couple seconds until the air temperature inside the cabin 10 is substantially equal to or less than the 45° C. ambient air. At this point, valve 12 is closed from the ambient air and the cooling cycle of the system begins.

After heat exchanger 14, the air is passed onto the main compressor 18 via valve 17, where it is compressed to ambient pressure of about 1 Atm. and the temperature of the air is increased accordingly. The temperature increase at this point can be in a range of 45°–75° C. depending on the coefficient of efficiency of the compressor. At this stage, the air is blown through the desiccant 19 which has the effect of removing the absorbed moisture and thereby regenerating the desiccant 19. After the desiccant 19, the air is exhausted from the system.

When the cooling system of the present invention is employed in a residential application (e.g., a house or apartment), the exhausted hot air after desiccant 19 can be passed through another heat exchanger 11 which can be used to heat water for the household. This subsequent use of the exhausted hot air from system 100 will help reduce fuel consumption of the household (i.e., fuel used to otherwise heat water) and helps increase efficiency of the air conditioner system.

In automobile applications, when the air being blown out of the system has been increased in pressure to greater than 1.2 Atm., this exhaust can be used to charge the engine (e.g., like a turbo charger). This described cycle can be repeated as necessary to reduce the air temperature after the cooling turbine 13 to 0° C., and thereby reduce the temperature inside cabin 10 to a desired temperature. Those of ordinary skill in the art will recognize that based on current efficiency ratings, conditioning systems are capable of reducing the temperature in the compartment to 12° C. less than the ambient air temperature. In the event that the air temperature starts to fall below the air conditioning system operating temperature of 0° C., additional warmer outside air can be added via valve 12, or the air flow through the system and vacuum (i.e., sub atmospheric pressure) can be reduced by letting outside air in through valve 17 to the main compressor 18.

Figure 1B:
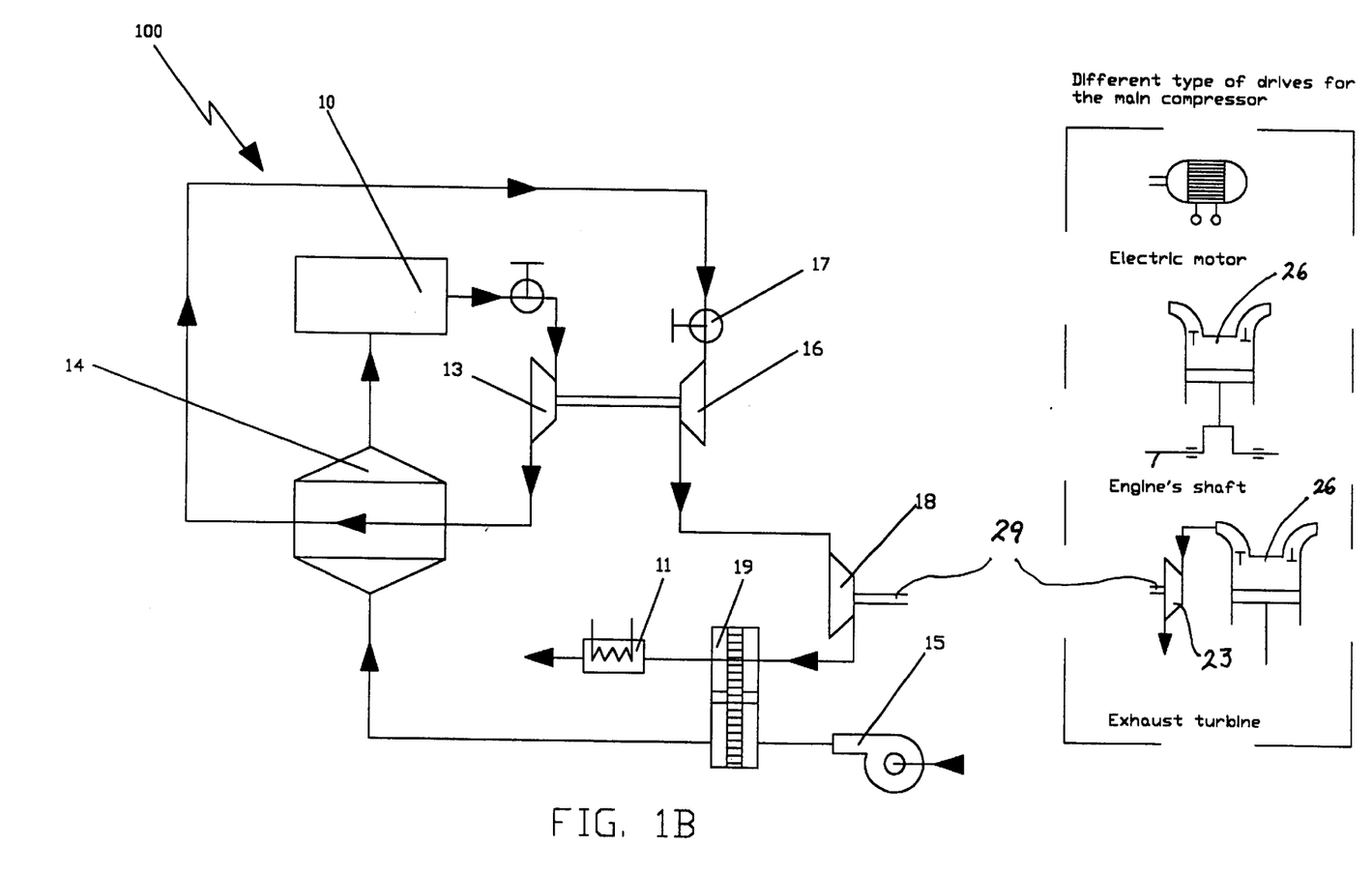
FIG. 1b is a schematic view of the air cycle air conditioning system according to a second embodiment of the invention.

In accordance with another embodiment adapted specifically for automobiles, system 100 may be driven through via an exhaust turbine 23 that is driven by the exhaust gases of the automobile. As shown in FIG. 1b, the exhaust of the automobile engine/cylinders 26 is connected to an exhaust turbine 23. In this configuration, the system 100 utilizes energy usually dumped from the automobile in the form of heat, noise and forced air. When the exhaust valve of the engine or cylinder first opens, the flow therethrough is critical. This critical flow occurs when the cylinder pressure is more than twice the exhaust manifold pressure. Provided this condition is exists, the otherwise wasted energy of the exhaust gases will drive the exhaust turbine 23, which in turn can drive an electric generator 30 or the main compressor 18 (via the shaft of exhaust turbine 23). When the cylinder pressure drops below the critical pressure some crankshaft power will be required to drive the exhaust turbine. The crankshaft power required at this stage will be significantly lower than that which is required to drive the main compressor 18 by the engine shaft or high speed electric motor 28. In all the aforementioned embodiments, cooling turbine 13 helps to drive the booster compressor 16 or main compressor 18 which serves to reduce the energy required by the system.

When the cooling turbine 13 is arranged on the same shaft with the booster compressor 16, the system is significantly cheaper than the embodiment utilizing a high speed electric motor/generator, but is slightly less efficient than those embodiments.

Through the implementation of this system, not only is cold air efficiently recuperated without requiring the re-circulation of the air many times during the startup cycle, the system utilizes 100% fresh air in cabin 10 at all times. This further reduces the possibility of poisoning the people in the car cabin with exhaust gases and reduces the energy required to drive the system.

In addition, in automobile applications not only is the entire air conditioning system disposed under the hood of the car, but the heat exchanger disposed in front of the car radiator which raises the losses in the car engine operation ordinarily associated with prior art systems. The placement of an air conditioning system under the hood of the car is far from ideal, since under the hood is where all the heat from the engine is contained. As such, it is preferable to place the air conditioning system in an area of the automobile that is not subject to the heat of the engine compartment. Another significant limitation on the prior art designs is the placement of the heat exchanger in front of the radiator.

According to the air cycle air conditioning system of the present invention, one preferred location for the system is behind the rear seat of the passenger compartment. When disposed in this location, the exhaust turbine 23 can be coupled to the with the exhaust system of the automobile, which, as explained above, can drive the shaft of the electric generator 30 which supplies power to the high speed electric motor 28 driving the main compressor 18 on one end and the cooling turbine 13 on the other.

Although the electric generator 30 is disclosed for providing power to the high speed electric motor 28, the generator may also provide electrical power to other automobile systems, thereby reducing and potentially eliminating the energy load of the automobile's alternator based electric generation system.

Those of ordinary skill in the art will recognize that the air cycle air conditioning system of the present invention not only provides a simple, compact and efficient system, but also has low energy consumption costs associated with the recycling of all cooling energy and the lower pressure ratio between the main compressor and the cooling turbine. The direct result of the recycling of all cooling energy and the use of a desiccant to dry the input ambient air, is a significant reduction in the amount of energy required to operate the air cycle air conditioning system. In this manner, and unlike existing cooling systems, the power required to drive the air cycle air conditioning system depends only from the temperature inside the cabin 10 and not the temperature outside the cabin.

Figure 2A:
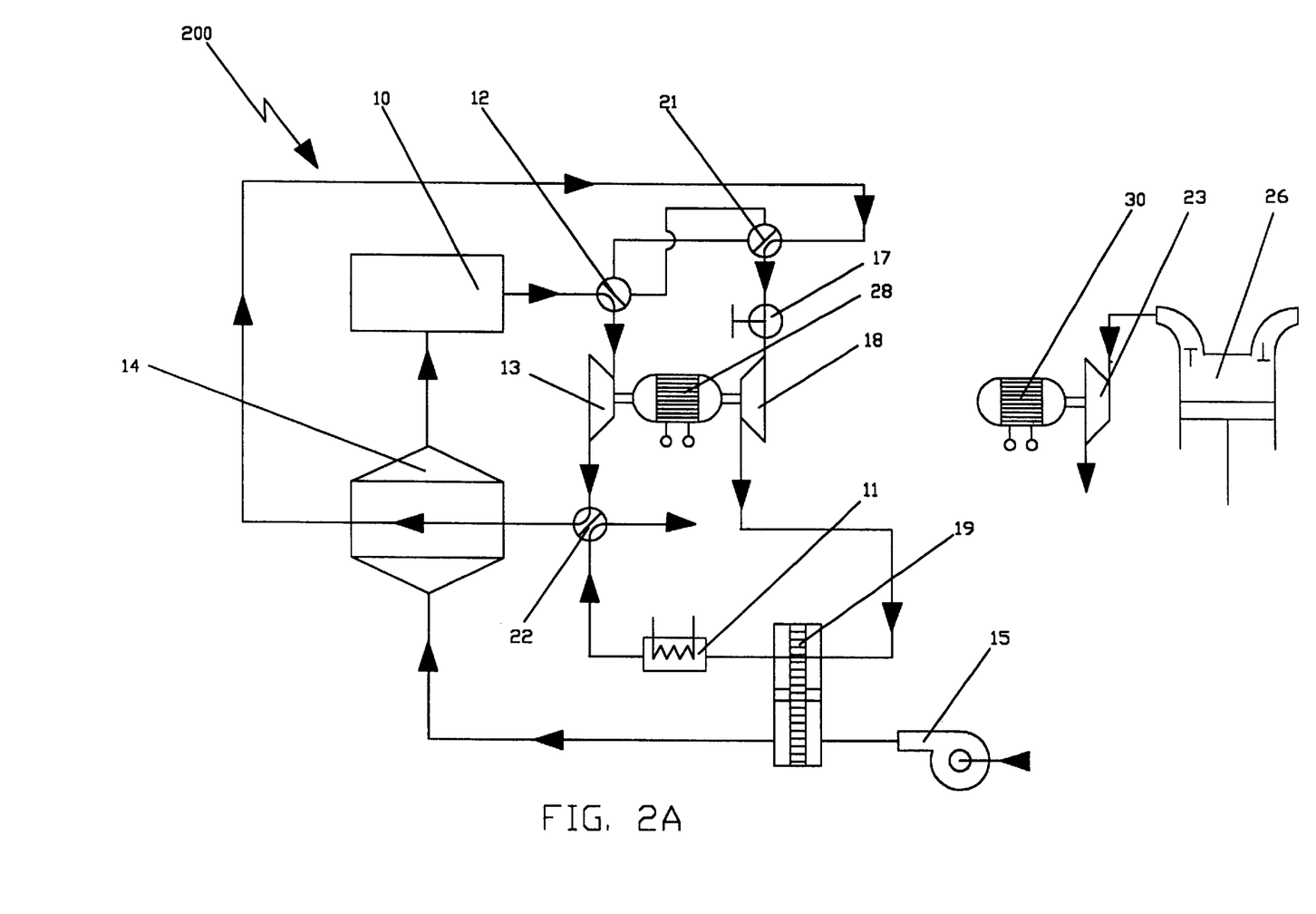
FIG. 2a is a schematic view of a modified air cycle air conditioning system according to the first embodiment of the invention.
Figure 2B:
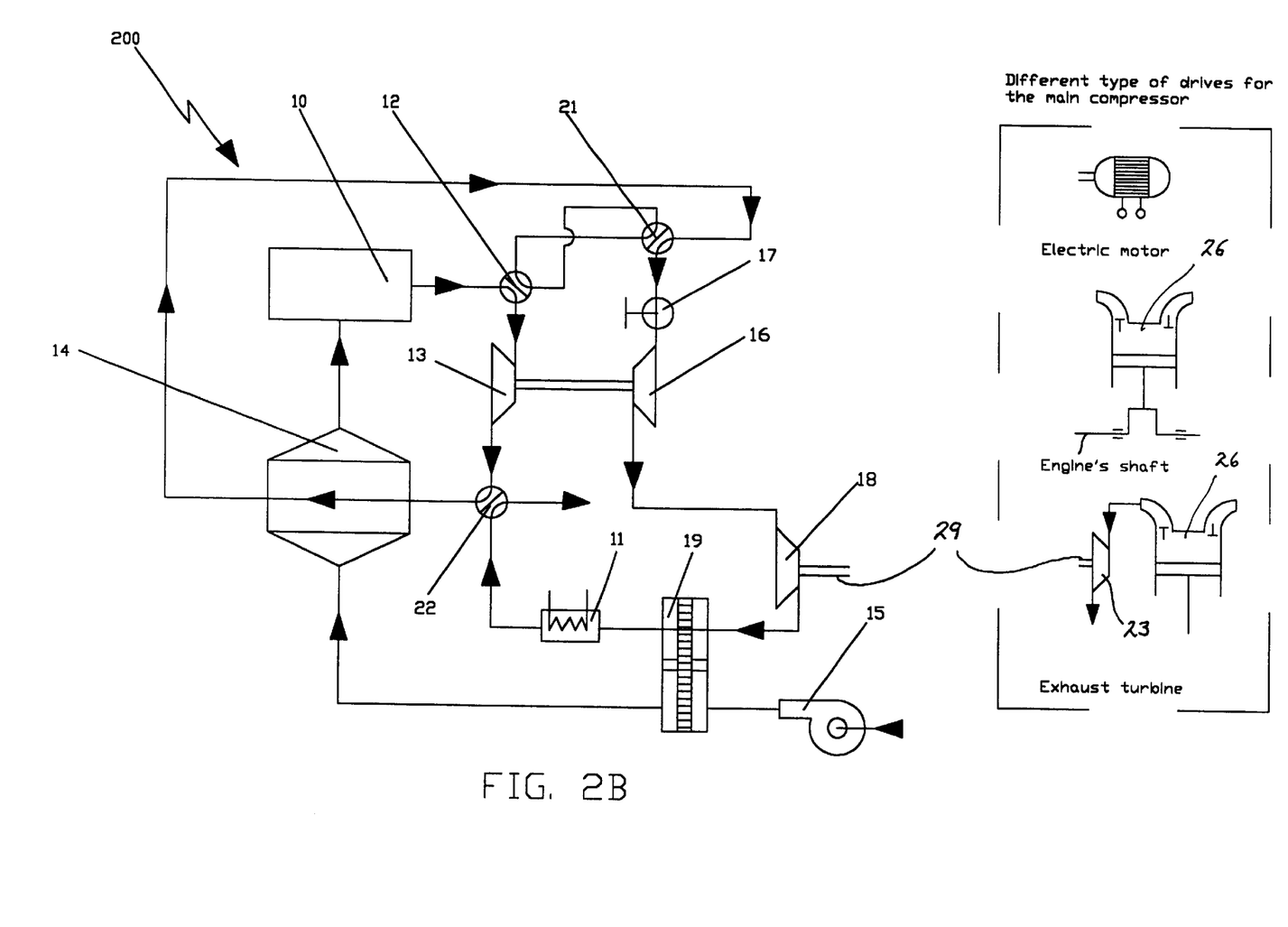
FIG. 2b is a schematic view of a modified air cycle air conditioning system according to the second embodiment of the invention.

FIG. 2a shows the air cycle air conditioning system 200 according to another embodiment of the invention. In this embodiment, valves 21–22 and corresponding ducts have been added to control the air flow within the system and thereby enable system 200 to be used as either an air conditioner or heat pump. The position of valves 21–22 as shown in FIG. 2a cause the system 200 to operate as an air cycle air conditioning (cooling) system and thereby is identical in operation to the embodiment described with reference to FIGS. 1a and 1b. Also shown is the implementation of the electric generator 30 connected to the exhaust turbine 23 disposed in the exhaust path of the cylinders/engine 26.

Figure 3A:
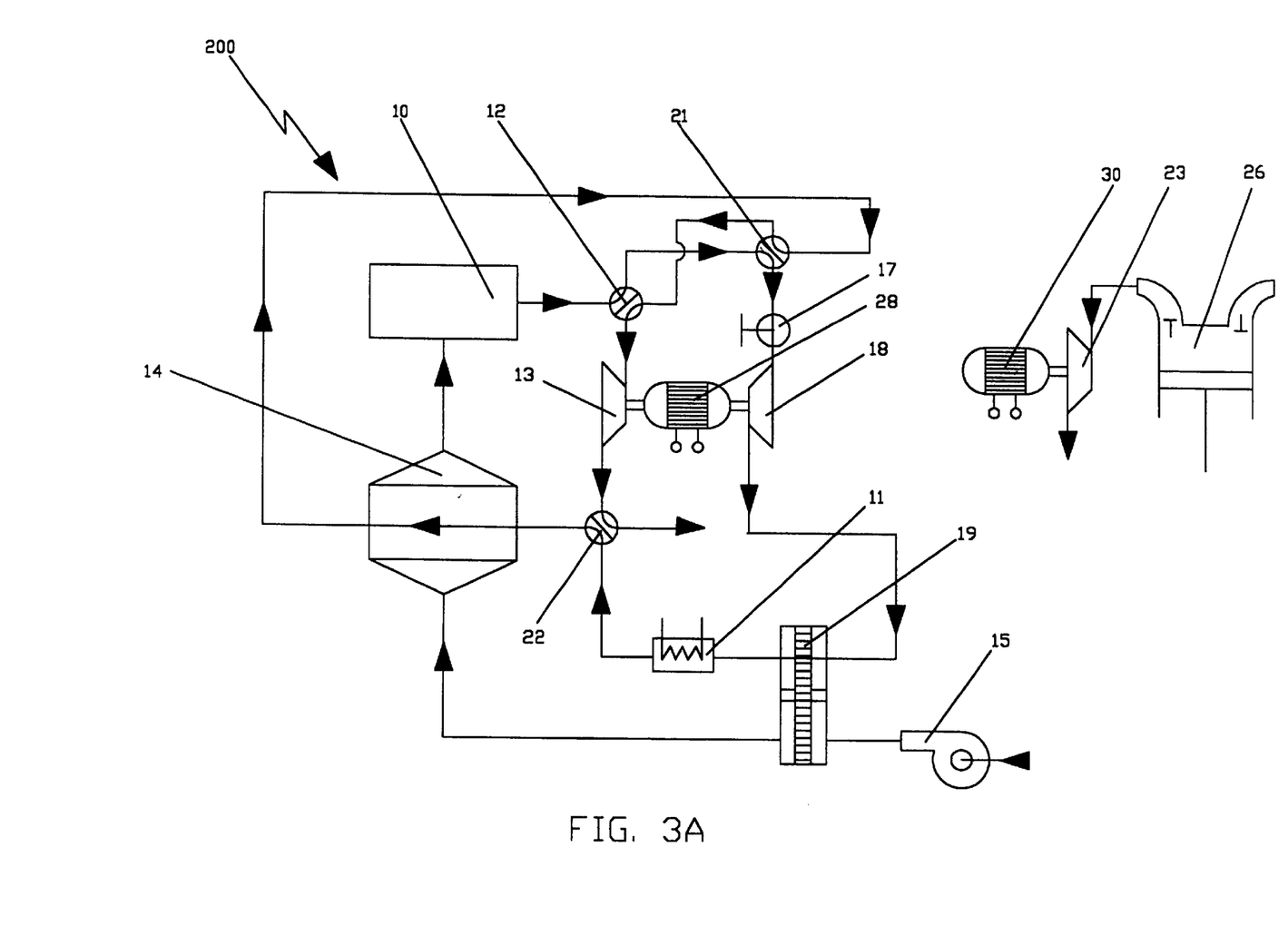
FIG. 3a is a schematic view of the air cycle air conditioning system of the first embodiment of FIG. 2a shown in a heat pump operation mode.
Figure 3B:
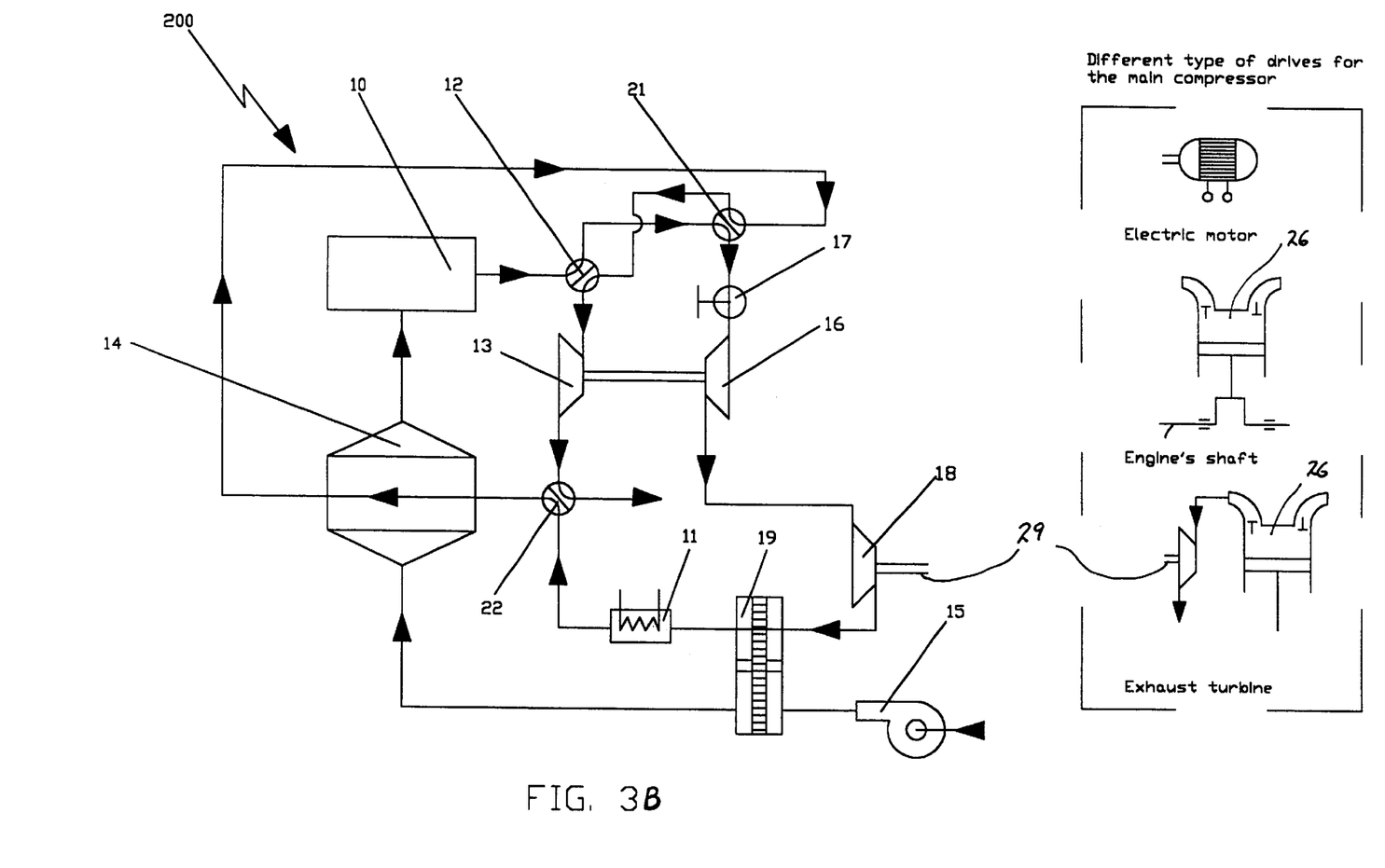
FIG. 3b is a schematic view of the air cycle air conditioning system of the second embodiment of FIG. 2b shown in a heat pump operation mode.

FIGS. 3a–3b however, show the operation of the previously described embodiments of system 200 as a heater (i.e., a heat pump). By changing the position of valves 12 and 21–22, the air cycle air conditioning system can be converted into a heat pump for heating the cabin 10 during winter months. FIGS. 3a and 3b show the heat pump operation of the corresponding cooling systems depicted in FIGS. 1a, 2a and 1b, 2b, respectively.

Referring to FIG. 3a, the air within cabin 10 is fed to the main compressor 18 via valves 12, 21 and 17. Main compressor 18 compresses the air to a high pressure (e.g., 1.3 Atm–2.0 Atm) and thereby increases the air temperature in a range of 45–75 C. for each cycle. The compressed, increased temperature air leaving main compressor 18 is fed into heat exchanger 14 via desiccant 19 and valve 22, where the outside air is blown into cabin 10 by fan 15. After leaving heat exchanger 14, the compressed air is fed into the cooling turbine 13 (via valves 21 and 12) where it is expanded back to 1 Atm, thereby returning energy to the main compressor, or to booster compressor 16, and ultimately exhausted from the system via valve 22. Thus, it is clear that after a few cycles the temperature within cabin 10 will be significantly increased. The operation of high speed electric motor 28 and generator 30 in the various embodiments is identical to that of the cooling systems of FIGS. 1a–1b.

Those of skill in the art will recognize that during Winter months, desiccant 19 is used to add moisture to the dry cold ambient air that is forced into the cabin. Thus, desiccant 19 can be used to make the hot air less dry within cabin 10 and thereby make the heat more comfortable for the people within the cabin 10.

Referring to FIG. 3b, when system 200 is to be used as a heat pump, the air within cabin 10 is first fed to the booster compressor 16 via valves 12, 21 and 17. The booster compressor increases the pressure of the air by using power from the cooling turbine 13, which directly causes a reduction in power required to operate the heat pump. From the booster compressor 16, the air is fed into the main compressor 18 where it is compressed to a high pressure and high temperature (e.g., 1.3 Atm–2.0 Atm.) thereby increasing the air temperature in a range of 45°–75° C. for each cycle. The compressed air with increased temperature is then passed through the desiccant 19 and the main heat exchanger 14 where it heats the air passing therethrough via fan 15, and which air heats the cabin 10. After leaving heat exchanger 14, the compressed air is fed into the cooling turbine 13 via valves 21 and 12 where it is expanded back down to 1 Atm and can be used to return energy to booster compressor 16 and then exhausted from the system.

As mentioned previously, the hot air after desiccant 19 passes through heat exchanger 11 where it can be used to heat water for the household. After passing through heat exchanger 11, the air may be passed to heat exchanger 14 where it is blown into the cabin 10. Thus, those of skill in the art will recognize that the system of the present invention can fulfill all needs for hot water and heat in the household for the winter months, while also providing cold air and hot water for the household in the summer months. By running the system of the present invention through a full year, the resulting energy and fuel savings are greater than 50% compared with the conventional air conditioning and boiler systems of the prior art.

Similar to the cooling system described in FIGS. 1 and 2, the area to be heated (e.g., passenger compartment of an automobile) is used as a heat storage chamber within the system. As such, when used as a heat pump, the system 200 utilizes all of the heat energy while at the same time enabling the use of 100% fresh air at all times which prevents the possibility of poison resulting from exhaust gases. This enables the system to effectively heat the car cabin before the car engine warms up.

According to the above description, the systems 100 and 200 can be made very compact having very low power consumption and, for example, in automobile applications can eliminate the need for placing the heat exchanger in front of the radiator. Be removing the heat exchanger from in front of the radiator, not only is the heat load for the engine is significantly reduced, the radiator itself can be made smaller which accordingly reduces losses related to its load on the engine. Assuming an 85% coefficient of efficiency (COE) for the cooling turbine 13 and a 75% COE for the compressors 16 and 18, the aforementioned systems 100 and 200 will operate at an estimated energy consumption of 1.7 kw per 3.5 kw of cooling capacity. This energy consumption is approximately a 13% increase compared with the energy requirements of existing Freon automobile air conditioning systems.

Those of ordinary skill will recognize that other variables may be altered to decrease the energy consumption of the exemplary systems disclosed. Examples of such variables would be utilizing components that have a higher COE that previously stated. For example, the cooling turbine can have a 90% COE and the compressors can have a COE of 85%, in this case, the energy consumption of systems 100 and 200 would decrease significantly. Another example would be to integrate the system of the invention into a household, cooling cabinets for electronic equipment, etc.

In addition to the aforementioned possible alternatives for increasing system efficiency and decreasing energy consumption, the initial cost of such system can be lowered by utilizing cast aluminum for the main compressor and molded plastic for the cooling turbine and booster compressor. In addition, the cooling turbine can sit on the same shaft with the main compressor and thereby eliminate the need for the booster compressor, and at the same time all the energy from the cooling turbine will be returned to the main compressor. In a simple cooling system where we cool, for example cabinets, the fan can be eliminated and suction from the compressor can be used to force the cooled air into the cabinet.

Figure 4:
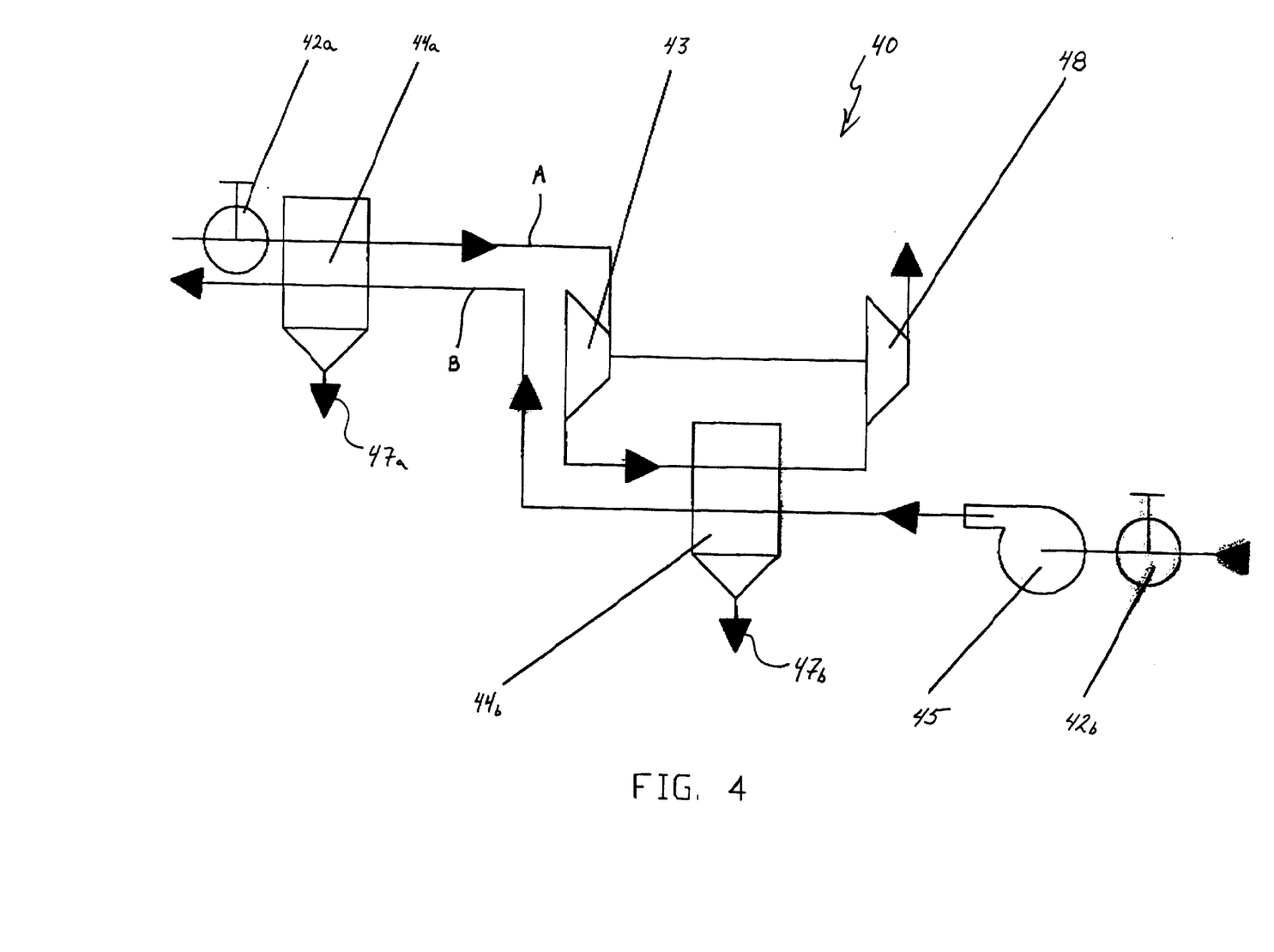
FIG. 4 is a schematic diagram of a water producing machine according to an embodiment of the invention.
Figure 5A:
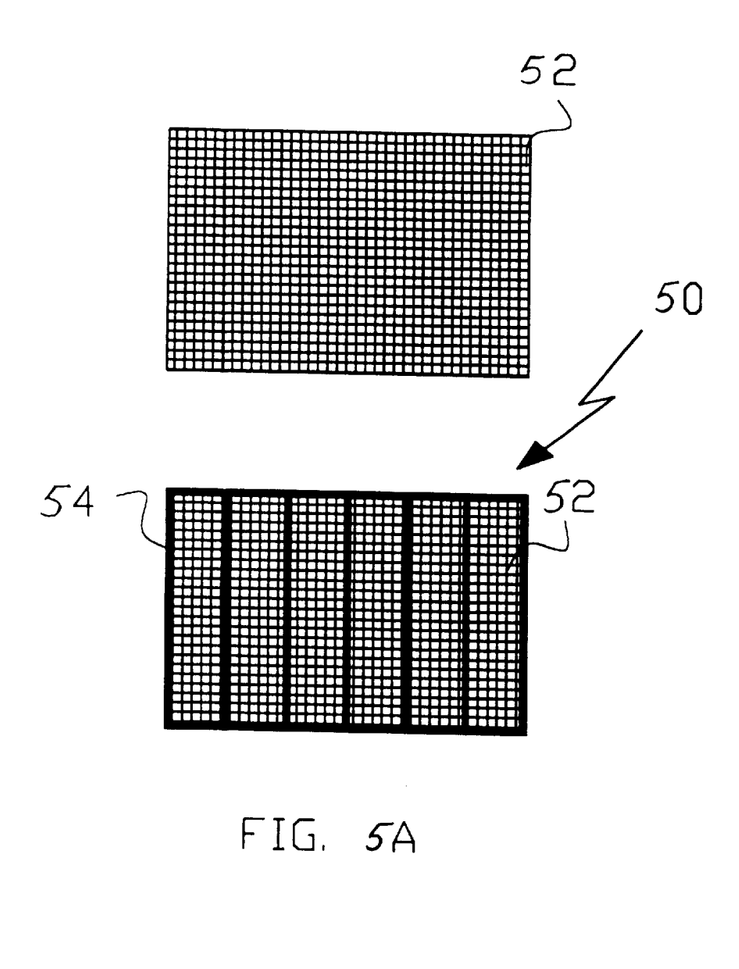
FIGS. 5a is a diagrammatic representation of a heat exchanger according to an embodiment of the invention.
Figure 5B:
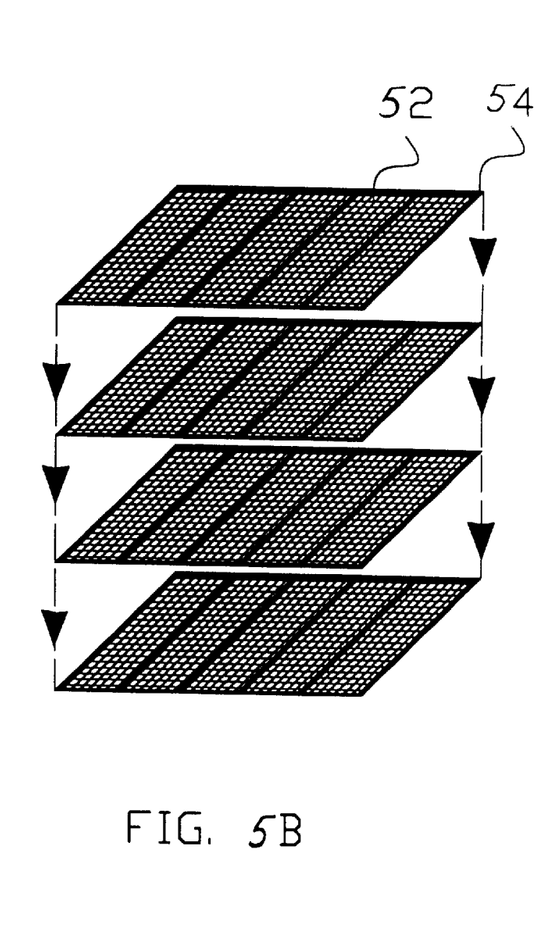
FIG. 5b is a diagrammatic representation of the heat exchanger according to an embodiment of the invention.
Figure 5C:
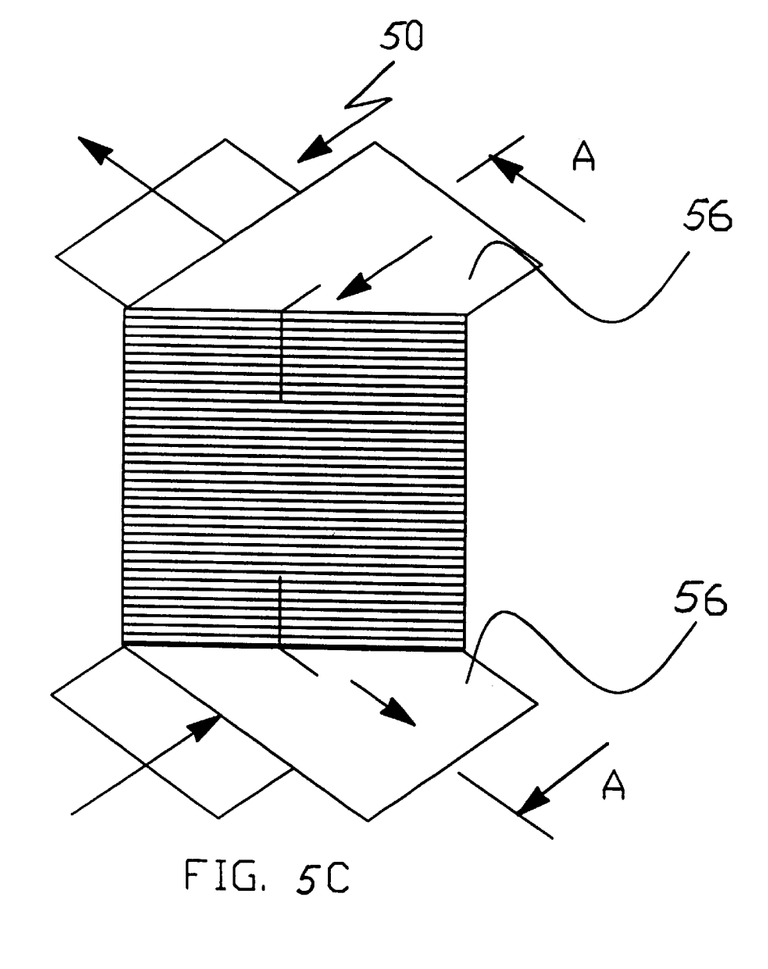
FIG. 5c is another diagrammatic representation of the heat exchanger according to an embodiment of the invention.
Figure 5D:
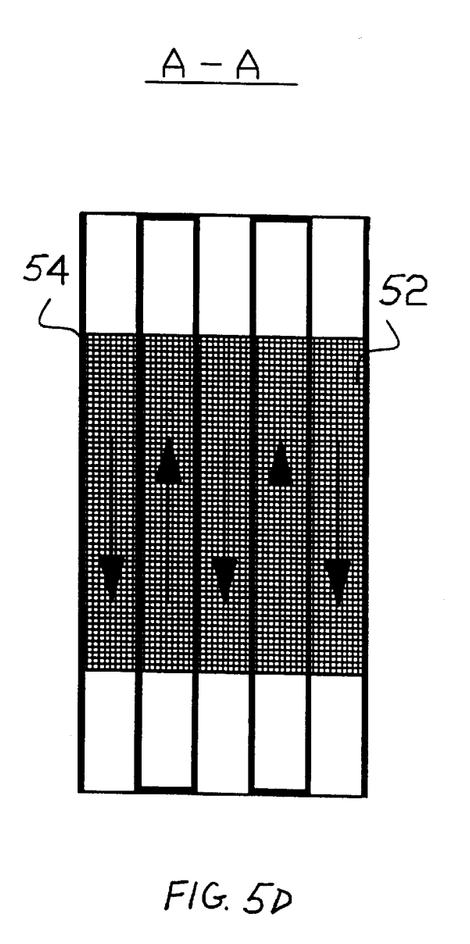
FIG. 5d is cross-sectional view of the heat exchanger taken along lines A—A of FIG. 5c.

FIG. 4 shows a block diagram of an air-cycle water producing machine 40 according to an embodiment of the invention. This machine is particularly applicable for geographic area having low rainfall, deserts, low water wells or no desalizination plants in salt water environments (e.g., islands). Fresh air enters the system through valves 42a and 42b and travels along paths A and B, respectively. The air through valve 42a passes through heat exchanger 44a and onto cooling turbine 43. Cooling turbine 43 expands the air to 0.5–0.8 Atm. and thereby lowers its temperature to 0° C. The 0° C. air is passed through a second heat exchanger 44b and onto compressor 48 where it is compressed back to 1 Atm. and exhausted from the system. Cooling turbine 43 and compressor 48 can be driven by a high speed electric motor (not shown) or any other suitable drive means. Fresh air entering the system via valve 42b is blown by fan 15 through heat exchanger 44b where it is cooled. The cooling of air in the heat exchanger 44b causes the water to condensate and as a result produces a water output 47b. The cold dry air leaving heat exchanger 44b is passed through heat exchanger 44a where it cools the fresh air entering the system via valve 42a. The cooling taking place in the heat exchanger 44a at this stage also produces a water output 47a, resulting from the condensation within the heat exchanger. The cooled air is then fed to the cooling turbine 43, and the cycle is repeated.

Those of skill in the art will recognize that the system 40 can be turned into a pressure cycle system in which case the flow of air in paths A and B would be reversed and connected at the end by valve 42a. In a pressure cycle, fan 45 could be reversed to suck air through the system, while the input air would be compressed by compressor 48 in a range of 1.3–2.0 Atm and subsequently expanded by cooling turbine 43.

This air cycle water producing system 40 can produce significantly more water compared with freon systems of the same cooling capacity. Because the cold air after heat exchanger 44a is fed to the cooling turbine 43 and then heat exchanger 44b, a double effect is achieved. That is, water is produced from the fresh air in the heat exchanger 44a and at the same time the temperature of the air is reduced prior to entering the cooling turbine 43. This results in a reduction of energy consumption required to operate the system. In addition, the work or energy extracted from the air by cooling turbine 43 is returned to help drive the compressor 48. Because all components of the system have a coefficient of efficiency less than 100%, the amount of energy required for the system is only that required to overcome the losses associated with the COE of the components.

FIGS. 5a–5d show an embodiment of a heat exchanger 50 according to the invention. The heat exchanger in an air conditioning/heat pump system is generally a large device, and as such, requires additional space to construct the system. Commonly used heat exchangers are called plate heat exchangers. These plate heat exchangers are generally one of the larger components in an air conditioning system and as such, is a significant factor in attempting to manufacture compact cooling/heating systems. Thus, it would be desirable to reduce the size of the heat exchanger without decreasing its efficiency and/or functionality within the cooling/heating system. The heat exchanger 50 includes a multitude of layers 51 composed of a wire mesh 52 and a glue, brazing or solder connection which forms the frame that maintains the mesh 44 in the desired configuration. The kind of material used to flame out the mesh and which the mesh is actually made of is a product of the pressure at with the heat exchanger is to work and the gas that is to flow through the heat exchanger. The size of the mesh is a matter of design choice depending on the desired air or liquid flow properties. As shown, a plurality of layers 51 are compressed to a desired thickness T to form the heat exchanger 50. Ducts 56 are then added according to the desired flow of heat and cool gas during operation.

By way of example, if a #400 mesh size is used as mesh 52, the effective surface area of heat exchanger 50 is increased by 20 times than that of the current plate heat exchangers available on the market, and the heat transfer coefficient will be higher (approx 3 to 4 times higher), because of the use of the thin wire. In view of the drastic increase in effective surface area, the size of heat exchanger 50 can be significantly decreased over the current plate heat exchanger while maintaining operating efficiency and capacity. Those of ordinary skill in the art will recognize that this heat exchanger can be used for gas to gas, gas to liquid, or liquid to liquid environments.

While there have been shown and described and pointed out fundamental novel features of the invention as applied to preferred embodiments thereof, it will be understood that various omissions, substitutions, changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. An air cycle air conditioning system comprising:
   a compartment to be cooled having an air input and air output, said compartment being disposed and adapted to operate as a primary cold storage chamber;
   a cooling turbine having an input connected to said air output of said compartment and an output, said cooling turbine expanding the air received from said compartment;
   a main heat exchanger connected to said air input of said compartment, said main heat exchanger receiving the expanded air from said cooling turbine;
   a fan positioned to work with said main heat exchanger and adapted to blow ambient air through said main heat exchanger and into said compartment;
   a desiccant disposed between said fan and said heat exchanger and adapted to remove moisture from the ambient air being blown into said heat exchanger by said fan; and
   a main compressor having an air input and output, said main compressor air input operably connected to said heat exchanger for receiving and compressing the expanded air prior to exhausting the air from the system.

2. The air cycle air conditioning system according to claim 1, further comprising a high speed electric motor connected to said cooling turbine and said main compressor.

3. The air cycle air conditioning system according to claim 1, further comprising:
   a first valve connected between said compartment and said cooling turbine;
   a second valve connected between said heat exchanger and said main compressor; and
   a third valve connected between said cooling turbine and said heat exchanger.

4. The air cycle air conditioning system according to claim 3, wherein said first valve is operable to allow ambient air into the system when the ambient air is cooler than air contained in said compartment upon start up of the air cycle air conditioning system.

5. The air cycle air conditioning system according to claim 1, wherein said desiccant is also disposed in the exhaust path of said main compressor, wherein exhausted air from said main compressor regenerates said desiccant by removing absorbed moisture contained therein.

6. The air cycle air conditioning system according to claim 1, further comprising:
   an exhaust turbine connected to an exhaust system of an automobile; and
   a generator connected to said exhaust turbine and adapted to supply energy to said main compressor, wherein said generator can be used to generate electrical power for the automobile.

7. The air cycle conditioning system according to claim 1, further comprising a booster compressor connected on a shaft in common with said cooling turbine; said cooling turbine driving said booster compressor.

8. The air cycle air conditioning system according to claim 7, further comprising a high speed electric motor for driving said main compressor.

9. The air cycle air conditioning system according to claim 7, further comprising a drive shaft of an automobile engine for driving said main compressor.

10. The air cycle air conditioning system according to claim 1, further comprising a secondary heat exchanger connected to the exhaust output of said main compressor.

11. The air cycle air conditioning system according to claim 10, wherein said secondary heat exchanger comprises a hot water heater utilizing hot air exhaust from said main compressor to heat water passing therethrough.

12. The air cycle air conditioning system according to claim 3, wherein adjustment of said first, second and third valves reverses the flow of air through the system and thereby converts said air cycle system into a heating system.

* * * * *